United States Patent [19]
Brooks

[11] 3,765,513
[45] Oct. 16, 1973

[54] BRAKE ACTUATING AND ADJUSTING MECHANISM

[75] Inventor: Frank W. Brooks, Dayton, Ohio

[73] Assignee: General Motors Corporation, Detroit, Mich.

[22] Filed: Oct. 30, 1972

[21] Appl. No.: 302,082

[52] U.S. Cl. ......... 188/71.9, 188/106 F, 188/196 D
[51] Int. Cl. ............................................ F16d 65/56
[58] Field of Search .............. 188/71.8, 71.9, 106 F, 188/106 P, 196 D, 196 BA

[56] References Cited
UNITED STATES PATENTS
3,601,233   8/1971   Marschall et al. .............. 188/196 D
3,726,367   4/1973   Evans............................ 188/71.9 X

*Primary Examiner*—Duane A. Reger
*Attorney*—W. S. Pettigrew et al.

[57] ABSTRACT

A brake mechanism having a pressure actuated piston moving disc brake pad assemblies into braking engagement with a disc for service brake operation, and a mechanically actuated mechanism which mechanically moves the piston to engage the brake pad assemblies with the disc for a parking brake operation. The piston has a screw and an adjuster nut threaded thereon, the nut being restrained from excess axial movement relative to a mechanically actuated shaft in one direction and a housing containing the piston and shaft in the other direction. The nut forms a part of a clutch arrangement which is actuated by the mechanically actuated shaft so that operative force transmitting engagement can occur between the shaft and the piston. The adjuster nut provides for clearance take-up and adjustment for lining wear during pressure brake actuation.

2 Claims, 1 Drawing Figure

PATENTED OCT 16 1973　　　　　　　　　　　　　　　3,765,513
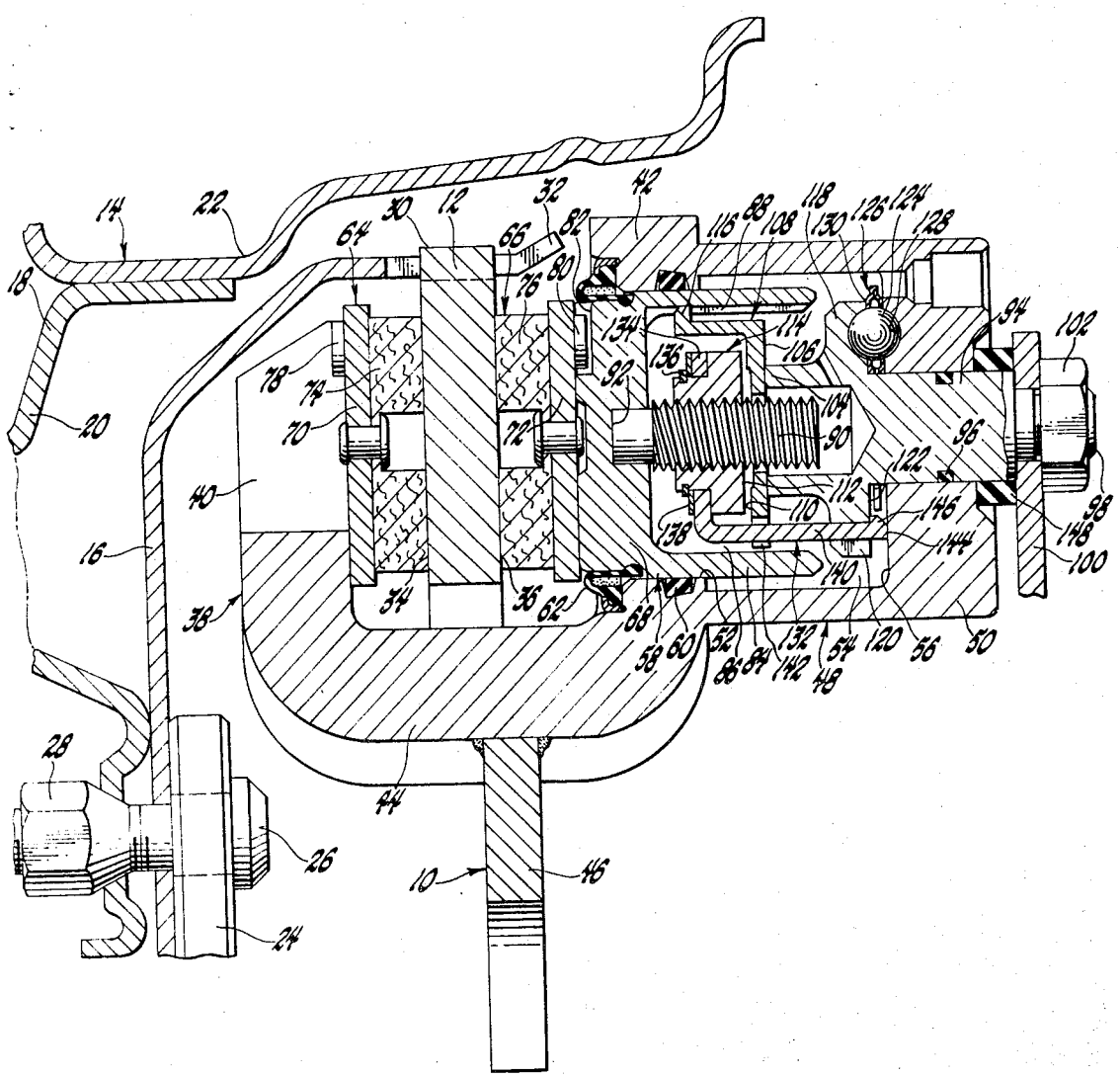

BRAKE ACTUATING AND ADJUSTING MECHANISM

The invention relates to a mechanism for actuating the brake shoes of a pressure actuated disc brake so as to maintain brake adjustment and to also actuate the brake by manual application to provide a parking brake mode of operation. The parking brake mechanism changes rotational or arcuate motion of an actuated lever to linear motion of the pressure actuated piston, and provides an arrangement for compensating for brake lining wear and for compensating for lining swell or growth. A high-lead screw and nut arrangement with a clutch mechanism is utilized, axial movement of the nut being limited by a restrainer device. The restrainer device, in combination with the clutch mechanism, establishes the normal and maximum brake lining clearances obtainable with the brakes properly adjusted.

IN THE DRAWING

The single FIGURE is a cross-section view, with parts broken away, of a disc brake assembly embodying the invention.

The general assembly includes a fixed caliper frame and support unit 10, a disc 12, a wheel assembly 14 including a brake disc drive and support member 16 and a wheel 18, a wheel disc section 20 and a wheel rim section 22. The wheel assembly also includes a hub, the hub flange 24 being shown in the drawing, to which the wheel disc section 20 and the brake disc drive and support member 16 are attached by means of bolts 26 and nuts 28.

The disc 12 is illustrated as being of the annular type with the outer periphery 30 being notched to receive circumferentially spaced fingers 32 of the member 16 so that the disc is axially slidable relative to the member 16. The disc 12 has opposed friction surfaces 34 and 36 which extend within the U-shaped fixed caliper frame 38.

The caliper frame 38 is a part of the fixed caliper frame and support unit 10 and has two radially outwardly extending legs 40 and 42 which are axially spaced and joined by a bridge section 44 extending through the anulus of the disc 12. The support flange 46 is secured to the caliper frame 38 and is also suitably fixed to a non-rotating portion of the vehicle such as an axle housing or a steering knuckle.

Leg 42 of the caliper frame includes a housing 48 which forms a cylinder body 50. The portion of the leg 42 from which housing 48 is formed has an opening therein facing the disc 12 and providing a cylinder wall 52 which is at the entry to the pressure chamber 54, also provided in housing 48. A base or end wall 56 of chamber 54 is formed from housing 48 and closes the outer end of chamber 54. A pressure actuated piston 58 is reciprocably received in chamber 54 and is sealed at cylinder wall 52 by the piston seal 60. A suitable boot 62 closes the outer end of chamber 54 to protect the piston and cylinder walls against contamination.

The brake pad assemblies 64 and 66 are mounted on the caliper frame 38 so that they transmit brake torque to the caliper frame. In addition to being mounted on the caliper frame 38, brake pad assembly 64 is mounted on leg 40 while brake pad assembly 66 is mounted on the head 68 of piston 58.

The pad assemblies respectively comprise shoes 70 and 72 to which brake linings 74 and 76 are suitably attached so as to frictionally engage friction disc surfaces 34 and 36 when the brakes are actuated. The outer sides of the brake shoes 70 and 72 are respectively provided with one or more bosses 78 and 80. The bosses aid considerably in locating the brake pad assemblies. Boss 80 of brake pad assembly 66 extends into a depression 82 formed in the outer side of the piston head 68 so that the piston cannot rotate for any substantial arcuate distance in the cylinder 52. Thus, the brake pad assembly provides means for normally preventing rotational movement of the piston.

Piston 58 also has a piston skirt section 84 extending away from head 68 and into chamber 54. The skirt provides a recess 86 which is a part of pressure chamber 54. The skirt inner wall has a plurality of splines 88 extending axially parallel to the piston. A high-lead threaded screw 90 is secured to the piston head 68 by suitable means such as having one end press fitted in a recess 92, the threaded portion of the screw 90 extending along the axis of the piston 58 through recess 86 and into chamber 54.

The base wall 56 of cylinder body 50 receives an actuating shaft 94 therethrough in reciprocal and rotatable relation, the shaft being provided with a seal 96 to seal pressure chamber 54. Shaft 94 has an outer end 98 to which an actuating lever 100 is suitably secured as by a retaining nut 102. Arcuate movement of lever 100 is accomplished by suitable means such as a brake operating cable, as is well known in the art, to obtain rotatable movement of shaft 94.

The inner end 104 of shaft 94 is recessed to the side of the threaded end of screw 90 in spaced relation thereto so that the end 104 is engageable with a side surface 106 of a clutch plate member 108. Member 108 has a clutch surface 110 axially opposite side surface 106 and aligned for engagement with clutch surface 112 of an adjusting nut 114. This nut is threaded on the screw 90 so that it rotates it also has axial movement imparted thereto. Clutch plate 108 has a notched lip 116 which mates with the splines 88 of piston skirt 84 so that the clutch plate is axially slidable relative to the piston but is not rotatable relative to the piston.

The shaft 94 has a center section formed to provide a flange 118 which has its outer periphery provided with a plurality of slots 120 and its surface 122 facing base wall 56 formed to receive balls 124 of a ball-ramp actuating mechanism 126. Mechanism 126 includes ball ramps 128 formed in base wall 56, the ramp angle determining the mechanical advantage of the mechanically actuated system. The balls 124 are circumferentially spaced by a ball cage 130.

An adjusting nut restrainer 132 has an inner end 134 fitting about the adjusting nut so as to permit rotation of the nut relative to the restrainer but preventing any substantial relative axial movement therebetween. A snap ring 136 and washer 138 are provided for these purposes. The restrainer 132 has fingers 140 extending axially from the restrainer end 134 through slots 142 formed in clutch plate 108 and through slots 120 of flange 118. The outer ends 144 of fingers 140 have radially inwardly extending lips 146 so that the lips engage the surface 122 of flange 118 to prevent axial movement of the restrainer, and, therefore, axial movement of the adjusting nut 114, toward the piston head 68 relative to shaft 94 beyond the predetermined distance set by the distance between lips 146 and restrainer inner end 134. The restrainer finger ends 144 also are abutable against base wall 56 so that axial movement of the restrainer and adjusting nut in a direction toward shaft 94 and away from piston head 68 is also limited.

A resilient member 148, formed as a rubber-like grommet, is received about the outer end of actuating shaft 94 intermediate the outer side of the base wall 56 and the lever 100, the member 148 being compressed by axial movement of the shaft 94 toward piston 58 as occasioned by action of the ball-ramp actuating mechanism 126 when lever 100 is rotated in the brake actuating direction. When the lever 100 is released, the resilient expanding action of member 148 urges the shaft 94 in a direction away from piston 58 to return the shaft to the brake release position. Member 148 also serves as an additional seal between shaft 94 and the housing 48.

When the brake assembly is actuated by the introduction of brake pressure into chamber 54, piston 58 is moved toward disc 12 to engage brake pad assembly 66 with the disc friction surface 36. As the pressure increases, disc 12 is forced to slide toward brake pad assembly 64 and into frictional engagement with the brake lining 74 of that pad assembly. The braking forces exerted on the pad assemblies by the rotating disc are transmitted from the linings to the shoes and then to the caliper frame 38.

The pressure in chamber 54 also urges shaft 94 away from piston 58, this force being transmitted through the balls 124 of the ball-ramp assembly 128. Therefore, there is no axial force exerted directly between the piston 58 and the shaft 94. As piston 58 moves leftwardly, it moves threaded screw 90 axially with it. Since the restrainer 132 will not permit leftward movement of nut 114 after the restrainer lips 146 engage the surface 122 of flange 118, further movement of the piston and its screw 90 causes nut 114 to rotate, thereby increasing the distance between the piston head and the nut in accordance with the amount of lining wear required to be taken up. When the brake is normally properly adjusted, the amount of actual axial movement of nut 114 is controlled by the slight clearances available between lip 146 and flange surface 122 and between the restrainer inner end 134 and the nut and washer 138. This will normally be only a few thousandths of an inch, the precise amount merely being sufficient to assure release of the brake linings in relation to disc 12 so that the linings do not drag on the disc with an undesirable amount of force when the brakes are released.

Upon release of the brake actuating pressure in chamber 54, piston 58 moves slightly inwardly into chamber 54 as the brake pads no longer exert braking forces on the disc. The amount of movement is controlled primarily by the clearance between restrainer end 144 and base wall 56 and secondarily by the clearance between clutch surfaces 110 and 112. Since the clutch plate 108 is splined to the piston shaft 84, it normally tends to move with the piston during actuation. Upon release, it will return to its position which is normally in free engagement with the end 104 of shaft 94.

If the piston should try to move further backward, it must slide clutch plate 108 on splines 88. If the space between the clutch surfaces 110 and 112 is taken up, the piston can retract no further since engagement of the clutch surfaces will prevent the nut 114 from rotating. Normally this space is not taken up during hydraulic actuation and release since the normal position of flange 118 in relation to base wall 56 and the axial thickness of lip 146 to end 144 are such that the axial limit of movement of restrainer 132 and nut 144 is reached beforehand.

During mechanical application of the brake, as when parking, for example, lever 100 is rotated by suitable means such as the pull of a brake cable attached to the lever and to a brake pedal or hand lever operated by the vehicle operator. Rotation of lever 100 causes balls 124 to ride up on ramps 128 and, therefore, move flange 118, and with the shaft 94, in a closing direction in relation to piston 58. This is a leftward movement as viewed in the drawing. The shaft inner end 104 engages surface 106 of clutch plate 108 and moves the clutch plate axially with it to take up the distance between clutch surfaces 110 and 112 and to frictionally engage those surfaces. This engagement prevents rotational movement of adjusting nut 114 on screw 90, so that axial force is transmitted through the clutch plate and clutch surfaces and nut 114 to screw 90 and then to piston 58 to move the piston toward disc 12 concurrently with further leftward movement of actuating shaft 94.

When the mechanical brake system is released, resilient member 148, having been previously compressed during actuation, expands axially and moves shaft 94 in an opening direction in relation to piston 58, seen as rightward movement in the drawing. At the same time, the shaft rotates as the balls 124 roll back down the ball ramps 128. Piston 58 then moves rightwardly to a brake release position, with the clutch plate 108, adjusting nut 114, and nut restrainer 132 taking the same positions and actions as described above upon pressure release.

An embodiment of the invention has been disclosed and described in which the brake mechanism is adjusted during pressure actuation with the availability of a mechanical brake actuation independently of pressure actuation.

What is claimed is:

1. A brake actuator and adjuster comprising:
   a wheel cylinder formed in a housing and having a brake actuating piston reciprocably received therein and cooperating therewith to define a brake actuating pressure chamber;
   a high-lead screw secured to said piston and extending into said pressure chamber;
   an adjuster nut and clutch face member threaded on said screw for axial and rotational movement;
   a mechanical actuator including a shaft extending into said pressure chamber in axial alignment with said piston and said screw and having means for operatively mechanically imparting axial force and movement thereto toward said piston;
   means limiting axial movement of said nut and clutch face member in one direction relative to said shaft and in the other direction relative to said housing;
   a clutch member mounted on said piston for axial movement relative thereto and having a clutch face engageable with the clutch face of said nut and clutch face member to prevent rotation of said nut and clutch face member relative to said piston upon sufficient axial movement and force of said shaft toward said piston and to transmit further axial movement and force of said shaft to said piston;
   and means returning said shaft in an axial direction away from said piston when said mechanical actuator is released;

said adjuster nut and clutch face member maintaining adjustment of said piston by requisite rotational and axial movement thereof on said screw when said piston is moved by pressure in said chamber beyond the limit of movement set by said limiting means for said nut and clutch face member.

2. A brake mechanism comprising:

a housing having a brake actuating piston reciprocably received therein and cooperating therewith to define a pressure chamber, said piston having a brake pad assembly on the outer side and a recess defined by a piston skirt on the inner side, the wall of said skirt defining said recess having a plurality of splines extending axially parallel to the axis of piston movement in said housing;

a threaded member secured to said piston and extending through said recess coaxially with the axis of piston movement in said housing;

an adjusting nut threaded on said threaded member and rotatable relative thereto in screw relation, one side of said nut forming a clutch face surface and the other side of said nut having an axially effective restrainer thereon which permits relative rotation of said nut;

a clutch plate splined to said piston skirt splines for axial movement relative thereto and having a clutch face surface in axial movable engageable relation to said adjusting nut clutch face surface, and having a plurality of slots formed therein in circumferentially spaced relation radially outward of said clutch face surface;

an actuating shaft rotatably and reciprocably mounted in said housing with one end extending into said chamber and engaging said clutch plate, the other end extending outward of said housing and having an actuating lever secured thereto to impart rotational movement to the shaft, and a center portion having a flange thereon, the flange having a plurality of axially extending slots in the outer periphery thereof and one side surface formed to receive a plurality of rotatable balls of a ball-ramp actuator;

a ball-ramp actuator including a plurality of rotatable balls received on said flange one side surface and ball ramps formed on said housing and a ball cage member circumferentially positioning said balls;

and means resiliently urging said shaft axially outward of said chamber away from said piston and yieldably opposing axial movement of said shaft occasioned by rotation of said actuating lever and action of said ball-ramp actuator;

said restrainer having a plurality of actuating fingers extending axially away from said piston through said clutch plate slots and said shaft flange slots and formed with inwardly extending lips on the outer ends thereof engaging said flange one side surface to effectively prevent axial movement of said adjuster nut relatively away from said flange beyond a predetermined distance, said finger outer ends being in abuttable relation with said housing to effectively prevent axial movement of said adjuster nut in a direction away from said piston beyond a predetermined position relative to said housing.

* * * * *